United States Patent
Cong et al.

(10) Patent No.: US 8,092,107 B2
(45) Date of Patent: Jan. 10, 2012

(54) ELECTRONIC DEVICE WITH HEIGHT ADJUSTABLE KEYS

(75) Inventors: Ling-Yu Cong, Shenzhen (CN); Fu-Bo Gong, Shenzheng (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 390 days.

(21) Appl. No.: 12/545,879

(22) Filed: Aug. 24, 2009

(65) Prior Publication Data

US 2010/0254743 A1    Oct. 7, 2010

(30) Foreign Application Priority Data

Apr. 2, 2009    (CN) .............................. 200910301316

(51) Int. Cl.
 *B41J 5/00*    (2006.01)
(52) U.S. Cl. .... 400/488; 400/489; 400/492; 379/433.07
(58) Field of Classification Search .................. 400/488, 400/489, 492; 379/433.07; 345/184
See application file for complete search history.

(56) References Cited

U.S. PATENT DOCUMENTS

| | | | | |
|---|---|---|---|---|
| 5,635,928 A * | 6/1997 | Takagi et al. | ................... | 341/22 |
| 5,774,384 A * | 6/1998 | Okaya et al. | .................. | 345/169 |
| 6,314,274 B1 * | 11/2001 | Kumagai | ..................... | 455/90.3 |
| 6,559,399 B2 * | 5/2003 | Hsu et al. | ...................... | 200/344 |

* cited by examiner

*Primary Examiner* — Matthew G Marini
(74) *Attorney, Agent, or Firm* — Altis Law Group, Inc.

(57) ABSTRACT

An electronic device includes a housing, a key board, and a height adjustment apparatus. The key board includes a number of first keys and a number of second keys. The height adjustment apparatus includes a platform for supporting the second keys, a cross bridging, a sliding button, and a pushing rod. The cross bridging includes a first supporting arm and a second supporting arm, the first supporting has an end slidably connected to the platform and the other end pivotably connected to a securing portion. The second supporting arm has an end slidably connected to the platform. The sliding button includes a lever surface facing the cross bridging. The pushing rod includes a first end pivotably connected to the other end of the second supporting arm and a second end resisting the lever surface.

19 Claims, 6 Drawing Sheets

8,092,107 B2

ELECTRONIC DEVICE WITH HEIGHT ADJUSTABLE KEYS

BACKGROUND

1. Technical Field

The present disclosure relates to electronic devices and, particularly, to an electronic device with height adjustable keys.

2. Description of Related Art

A typical electronic device includes a number of keys, the keys are usually fixed to a circuit board, the height of the keys relative the base usually cannot be changed. When the electronic device is used for playing games, only a few of keys are required. However, because unrequired/negligible keys of the electronic device which are not needed during playing games are adjacent to the required keys, the unrequired keys are often stricken inadvertently during playing games.

What is needed, therefore, is an electronic device having height adjustable keys to overcome or at least mitigate the above-described problem.

BRIEF DESCRIPTION OF THE DRAWINGS

Many aspects of the present electronic device can be better understood with reference to the accompanying drawings. The components in the drawings are not necessarily drawn to scale, the emphasis instead being placed upon clearly illustrating the principle of the present electronic device. In the drawings, all the views are schematic.

DETAILED DESCRIPTION

Embodiments of the present disclosure will now be described in detail below, with reference to the accompanying drawings.

Figure 1:
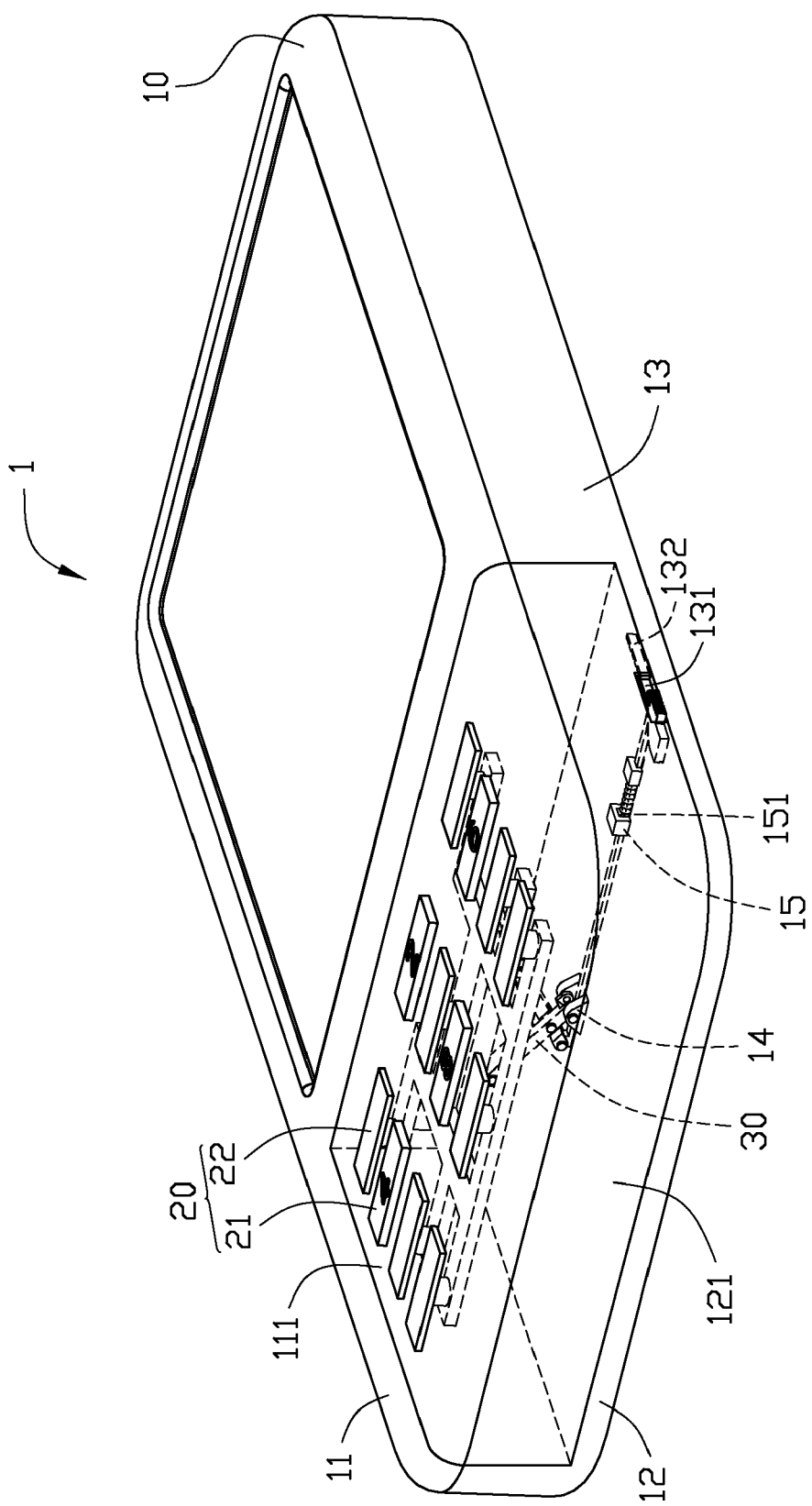
FIG. 1 is a schematic view of an electronic device according to an exemplary embodiment.

Referring to FIG. 1, an electronic device 1 according to an exemplary embodiment, is shown. The electronic device 1 includes a housing 10, a keypad 20, and a height adjustment apparatus 30. The keypad 20 is exposed out of the housing 10, and the height adjustment apparatus 30 is received in the housing 10. In the present embodiment, the electronic device 1 is a mobile phone.

The housing 10 includes a front wall 11, a back wall 12, and a side wall 13 substantially perpendicular to the front wall 11 and the back wall 12. The front wall 11 of the housing 10 defines an opening 111 for receiving the keypad 20. The back wall 12 includes a securing portion 14 and a guiding portion 15. The securing portion 14 and guiding portion 15 protrudes from an inner surface 121 of the back wall 12. The securing portion 14 is located under the keypad 20, and the guiding portion 15 is arranged between the securing portion 14 and the side wall 13 of the housing 10. The guiding portion 15 defines a guide hole 151 with center axis thereof substantially perpendicular to the side wall 13. The side wall 13 defines a sliding slot 131 substantially aligned with the guide hole 151 of the guiding portion 15. The sliding slot 131 extends along a direction substantially parallel to the back wall 12 of the housing 10. The side wall 13 further includes a latching rack 132 arranged at an end of the sliding slot 131. The latching rack 132 includes an engaging surface defining a number of notches 1321 substantially perpendicular to the back wall 12 of the housing 10. The latching rack 132 can be integrally formed with the side wall 13 of the housing 10.

The keypad 20 includes a number of first keys 21 and a number of second keys 22. In the present embodiment, the first keys 21 are designated ones for using predetermined features of the electronic device 1, such as playing games, and the second keys 22 are negligible when using the predetermined features of the electronic device 1.

Figure 2:
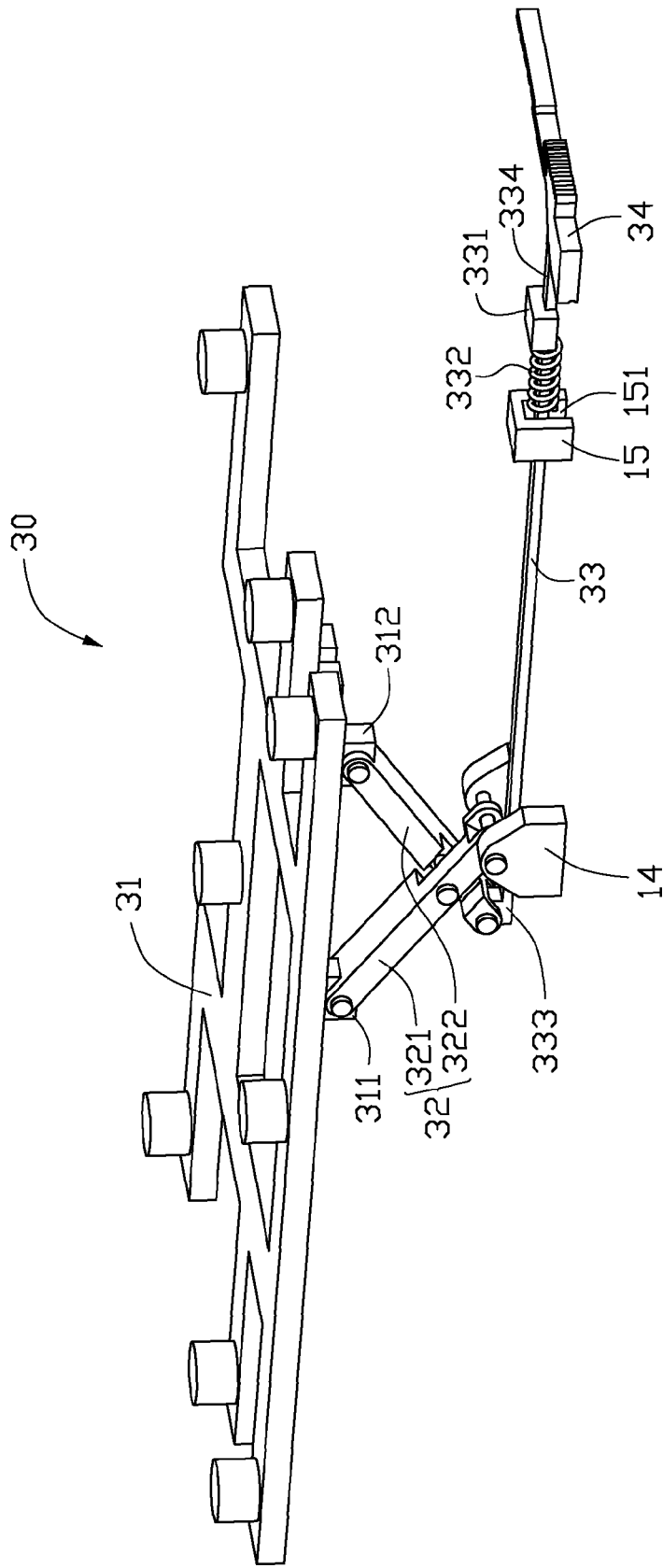
FIG. 2 is a schematic view of a height adjustment apparatus of the electronic device of FIG. 1.
Figure 3:
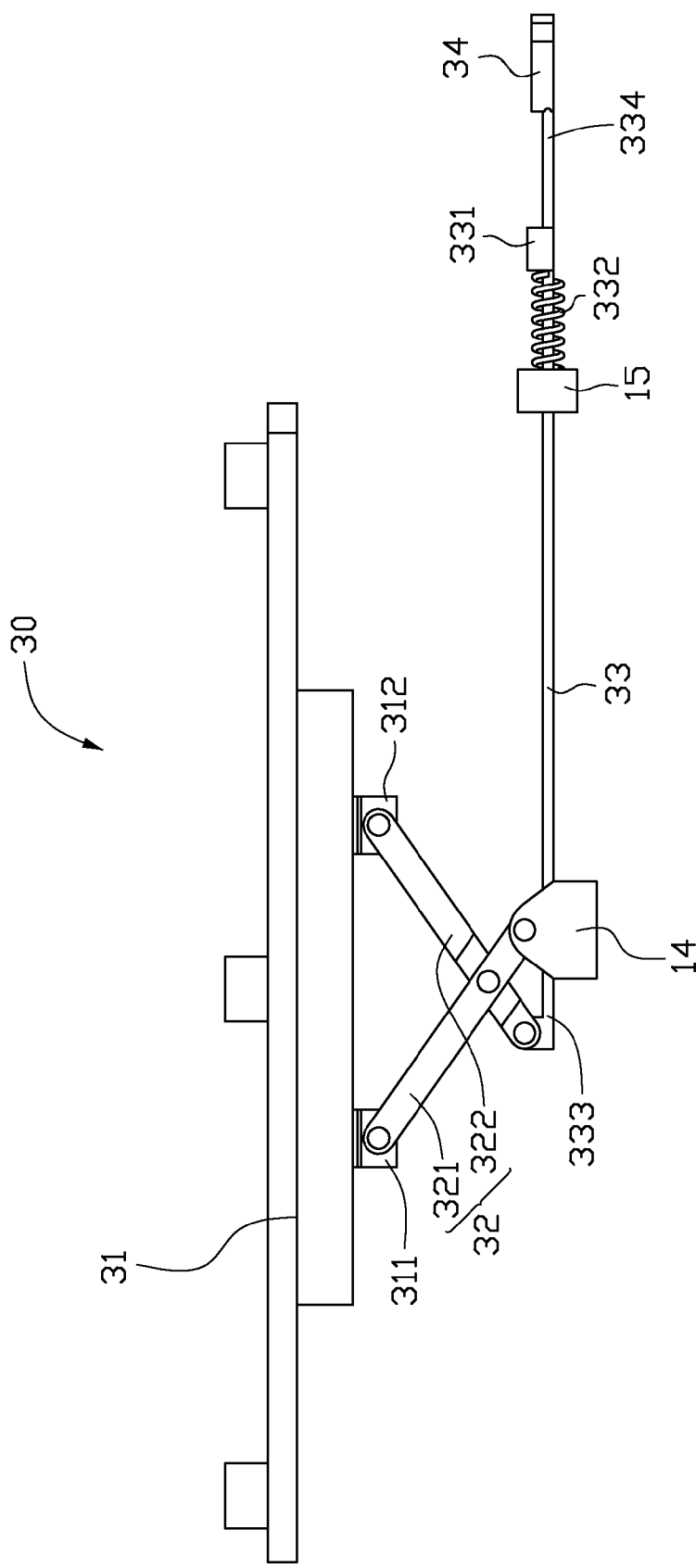
FIG. 3 is a schematic side view of the height adjustment apparatus of FIG. 2.

Further referring to FIGS. 2 and 3, the height adjustment apparatus 30 includes a platform 31, a cross bridging 32, a pushing rod 33, and a sliding button 34.

The platform 31 is configured for supporting the second keys 22. In the present embodiment, the platform 31 is a circuit board. The first keys 21 can be supported by other circuit board electrically connected to the platform 31 by wires etc. The platform 31 includes a first slidable block 311 and a second slidable block 312 which are slidable along a surface of the platform 31 facing the back wall 12.

The cross bridging 32 includes a first supporting arm 321 and a second supporting arm 322. The first supporting arm 321 is pivotably connected with the second supporting arm 322. In the present embodiment, a first end of the first supporting arm 321 is pivotably connected to the first slidable block 311, and a second end of the first supporting arm 321 opposite to the first end is pivotably connected to the securing portion 14 of the back wall 12. A first end of the second supporting arm 322 is pivotably connected to the second slidable block 312, and an opposite second end of the second supporting arm 322 is pivotably connected to the pushing rod 33.

The pushing rod 33 passes through the guide hole 151 of the guiding portion 15. The pushing rod 33 includes a first end 333 connecting to the second end of the second supporting arm 322, and a second end 334 resisting the sliding button 34. The pushing rod 33 further includes a block 311 formed between the sliding button 34 and the guiding portion 15. A spring 312 is sleeved on the pushing rod 33 and compressed between the guiding portion 15 and the block 311. The spring 312 keeps the second end 334 of the pushing rod 33 constantly resisting the sliding button 34. In other embodiment, the spring 312 and the block 311 can also be omitted, and the second end 334 of the pushing rod 33 is kept resisting the sliding button 34 by the weight of the platform 31 etc.

Figure 4:
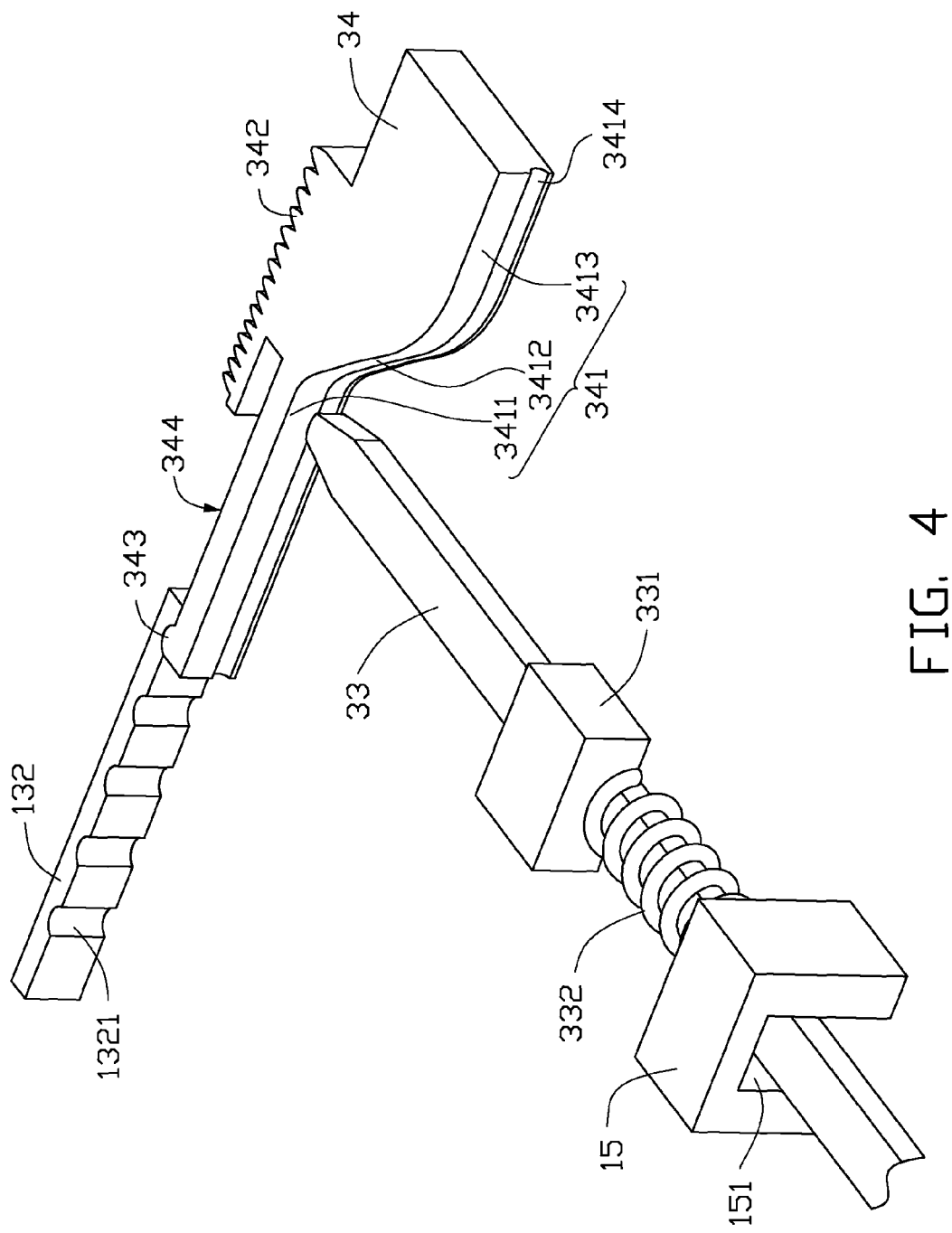
FIGS. 4, 5 and 6 illuminates engagement between a pushing rod and a sliding button of the height adjustment apparatus of FIG. 2.

The sliding button 34 is received in the sliding slot 131 on the side wall 13 and is slidable along the sliding slot 131. Further referring to FIG. 4, the sliding button 34 includes a first surface 341 facing the pushing rod 33, and a second surface 344 opposite to the first surface 341 and facing to the outside of the housing 10. The first surface 341 is a lever surface including a first flat surface 3411, an sloped surface 3412, and a second flat surface 3413. In the present embodiment, the first flat surface 3411 and the second flat surface 3413 are parallel to the second surface 344. The distance between the first flat surface 3411 and the second surface 344 is smaller than the distance between the second flat surface 3413 and the second surface 344. The sloped surface 3412 connects the first flat surface 3411 and the second flat surface 3413. The first surface 341 defines an engaging groove 3414 thereon for engaging with the second end 334 of the pushing rod 33. In other embodiments, the first surface 341 can also be an sloped surface or a curved surface.

The sliding button 34 further includes a latching portion 343 and an operation portion 342. The latching portion 343 extends from the second surface 344 of the sliding button 34 for engaging with the notches 1321 on the latching rack 132. The operation portion 342 extends out of the housing 10 from the second surface 344 of the sliding button 34. The operation portion 342 is configured for moving the sliding button 34 relative to the sliding slot 131 when receiving an external force. The operation portion 342 can be a protrusion, or a skid-resisting surface. In the present embodiment, the operation portion 342 is a protrusion with a skid-resisting structure on the surface of the protrusion.

Figure 5:
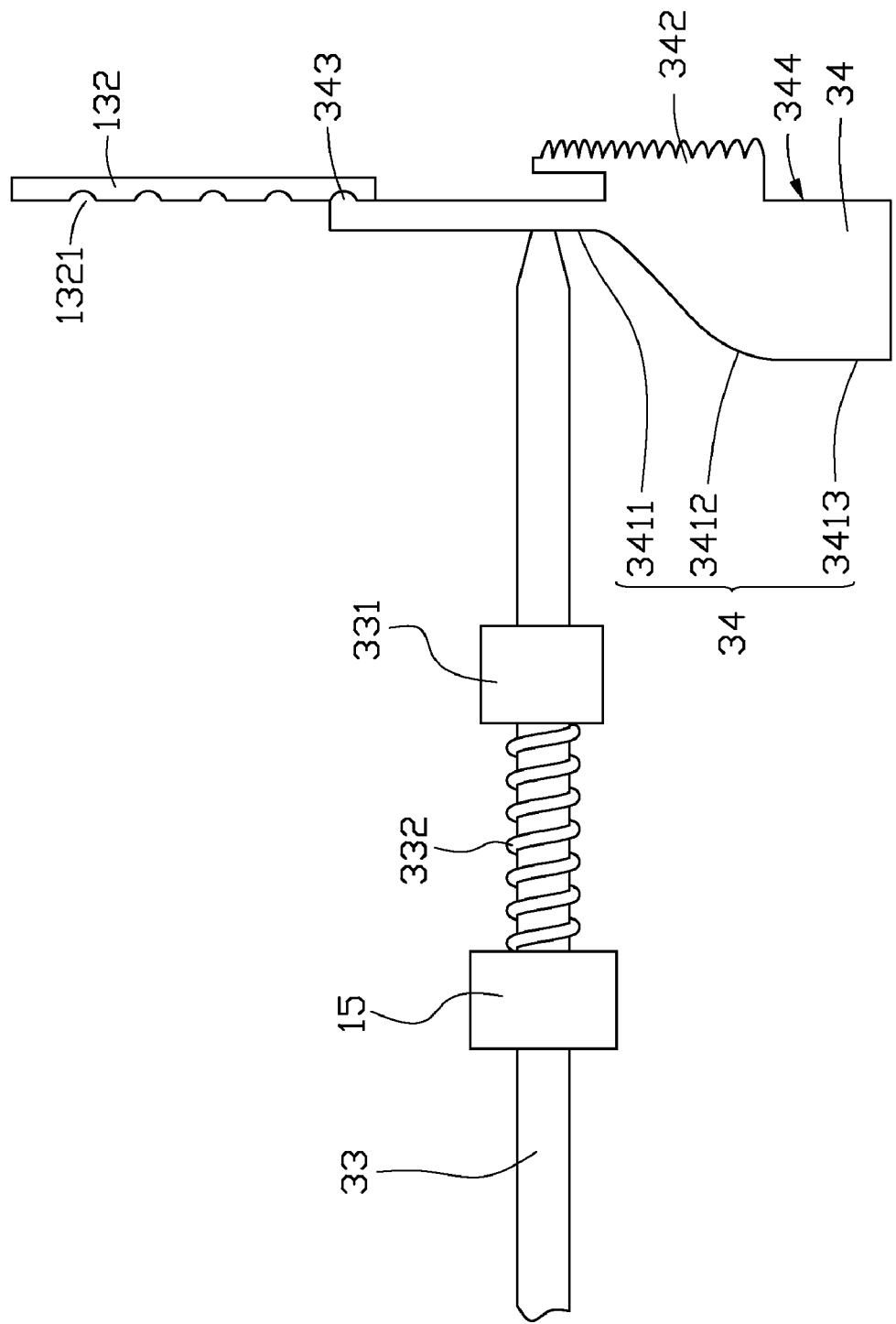
Figure 6:
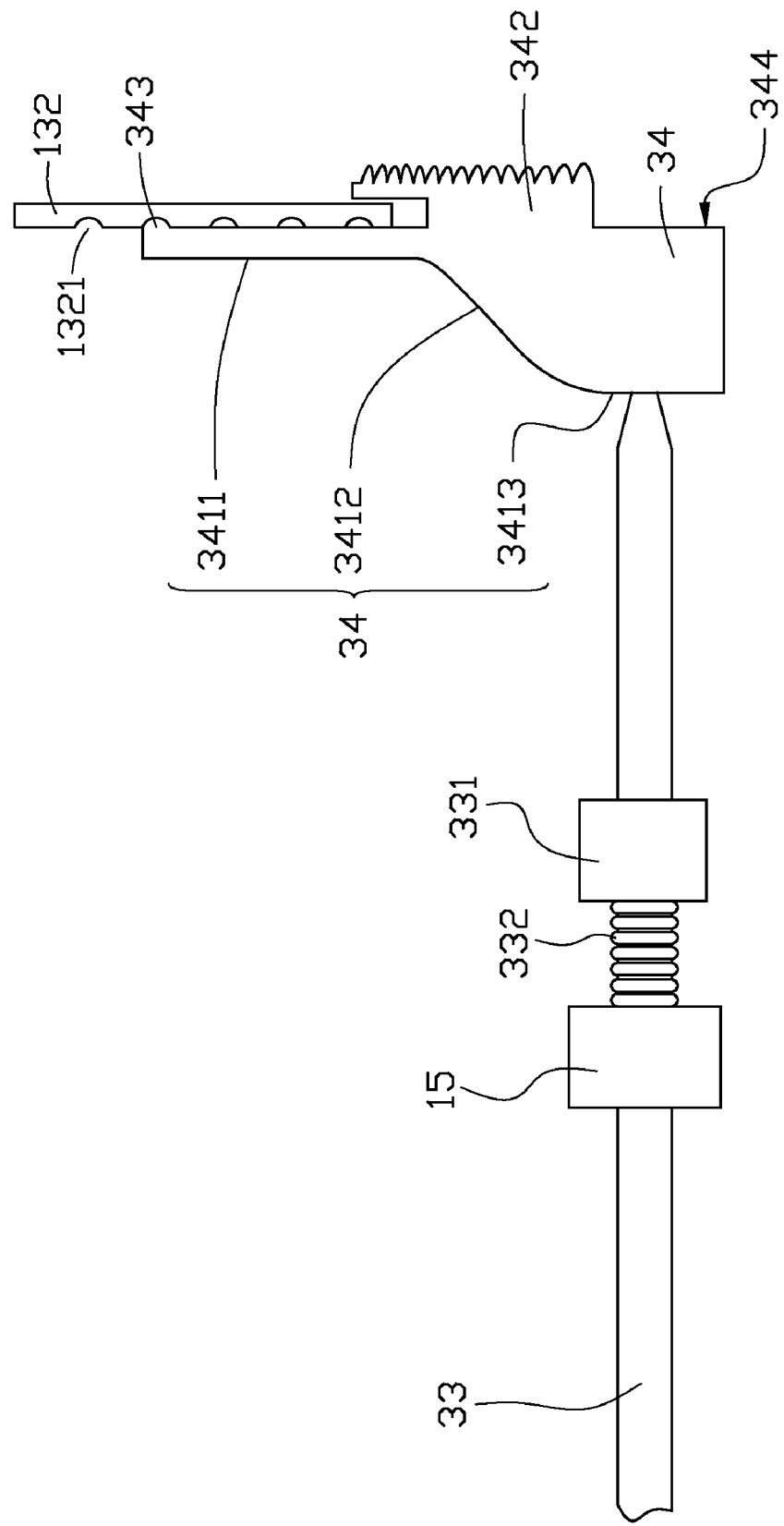

Referring to FIGS. 5 and 6, the second end 334 of the pushing rod 33 is pushed by the sliding button 34 along the first flat surface 3411, the sloped surface 3412, and the second flat surface 3413 of the sliding button 34, accordingly. Therefore, the height of the second keys 22 of the electronic device 1 can be adjusted by the height adjustment apparatus 30.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. An electronic device comprising:
   a housing comprising:
   a front wall defining an opening;
   a side wall defining a sliding slot; and
   a back wall comprising a securing portion and a guiding portion protruding from an inner surface of the back wall, the guiding portion defining a guide hole and being arranged between the securing portion and the sliding slot of the side wall;
   a key board received in the opening of the front wall, the key board comprising a plurality of first keys and a plurality of second keys; and
   a height adjustment apparatus comprising:
   a platform for supporting the plurality of second keys;
   a cross bridging comprising a first supporting arm and a second supporting arm, the first supporting arm having an end slidably connected to the platform and the other end pivotably connected to the securing portion, the second supporting arm having an end slidably connected to the platform;
   a sliding button slidable along the sliding slot of the side wall, the sliding button comprising a first surface facing the cross bridging, an opposite second surface, and an operation portion formed on the second surface, the first surface being a lever surface; and
   a pushing rod passing through the guide hole of the guiding portion, the pushing rod comprising a first end pivotably connected to the other end of the second supporting arm and a second end resisting the lever surface;
   wherein the lever surface comprises a first flat surface, an sloped surface, and a second flat surface connected in sequence, the first flat surface and the second flat surface are parallel to the second surface of the sliding button.

2. The electronic device of claim 1, wherein the guide hole of the guiding portion is substantially perpendicular to the side wall.

3. The electronic device of claim 1, wherein the sliding slot extends along a direction substantially parallel to the back wall.

4. The electronic device of claim 1, wherein the side wall further comprises a latching rack arranged at an end of the sliding slot, the latching rack comprises an engaging surface; the sliding button further comprises an latching portion, the latching portion extends from the second surface of the sliding button for engaging with the latching rack.

5. The electronic device of claim 4, wherein the engaging surface defines a plurality of notches substantially perpendicular to the back wall.

6. The electronic device of claim 4, wherein the latching rack is integrally formed with the side wall of the housing.

7. The electronic device of claim 1, wherein the plurality of first keys are designated keys for playing games, and the plurality of second keys are negligible when playing games.

8. The electronic device of claim 1, wherein the platform is a circuit board.

9. The electronic device of claim 1, wherein the platform comprises a first slidable block and a second slidable block which are slidable along a surface of the platform facing the back wall, the first slidable block and the second slidable block are pivotably connected to the first supporting arm and the second supporting arm respectively.

10. The electronic device of claim 1, wherein the pushing rod further comprises a block formed between the sliding button and the guiding portion, a spring sleeves the pushing rod and is compressed between the guiding portion and the block.

11. The electronic device of claim 1, wherein the distance between the first flat surface and the second surface is smaller than the distance between the second flat surface and the second surface.

12. The electronic device of claim 1, wherein the lever surface is an sloped surface or a curved surface.

13. The electronic device of claim 1, wherein the operation portion is a protrusion or a skid-resisting surface.

14. The electronic device of claim 1, wherein the operation portion is a protrusion with a skid-resisting structure on the surface thereof.

15. An electronic device comprising:
    a housing comprising:
    a front wall defining an opening; and
    a side wall defining a sliding slot;
    a key board received in the opening of the front wall, the key board comprising a plurality of first keys and a plurality of second keys; and
    a height adjustment apparatus comprising:
    a platform for supporting the plurality of second keys;
    a cross bridging comprising a first supporting arm and a second supporting arm, the first supporting arm having an end slidably connected to the platform and the other end pivotably connected to a securing portion fixed relative to the housing, the second supporting arm having an end slidably connected to the platform;
    a sliding button slidable along the sliding slot of the side wall, the sliding button comprising a first surface facing the cross bridging, an opposite second surface, and an operation portion formed on the second surface, the first surface being a lever surface; and
    a pushing rod movable along the axis thereof, the pushing rod comprising a first end pivotably connected to the other end of the second supporting arm and a second end resisting the lever surface;
    wherein the lever surface comprises a first flat surface, an sloped surface, and a second flat surface connected in sequence, the first flat surface and the second flat surface are parallel to the second surface of the sliding button.

16. The electronic device of claim 15, wherein the side wall further comprises a latching rack arranged at an end of the sliding slot, the latching rack comprises an engaging surface; the sliding button further comprises an latching portion, the latching portion extends from the second surface of the sliding button for engaging with the latching rack.

17. The electronic device of claim 16, wherein the latching rack is integrally formed with the side wall of the housing.

18. The electronic device of claim 15, wherein the platform comprises a first slidable block and a second slidable block which are slidable along a surface of the platform facing the back wall, the first slidable block and the second slidable block are pivotably connected to the first supporting arm and the second supporting arm respectively.

19. The electronic device of claim 15, wherein the pushing rod further comprises a block formed between the sliding button and the guiding portion, a spring sleeves the pushing rod and is compressed between the guiding portion and the block.

* * * * *